Patented Nov. 7, 1939

2,179,258

UNITED STATES PATENT OFFICE 2,179,258

COMPOSITION FOR SOLDERING METAL

John Frederick Howarth, Long Beach, N. Y., assignor of one-half to Albert I. Elias, New York County, N. Y.

No Drawing. Application January 22, 1937, Serial No. 121,824

2 Claims. (Cl. 148—26)

This invention relates to a composition for soldering metal, or to soldering flux, and to methods of joining metals by soldering.

The invention is particularly concerned with the joining or soldering of aluminum.

With the flux of my invention, aluminum, zinc, galvanized iron, lead, tin, copper and its alloys, iron, cast iron, steel and most steel alloys, and many other metals may be soldered with almost equal facility, and may be joined to each other.

I have made extensive tests of various chemical materials including fluorides and chlorides of metals, as fluxes for various metals and metallic alloys, and more particularly for the soldering of aluminum and its alloys.

By experiment I have discovered that to properly solder aluminum, it is essential that the aluminum be first alloyed with zinc at a comparatively high temperature at the part to be soldered, and to do this efficiently I employ a flux comprising a metal fluoride, ammonium chloride, and zinc chloride.

I have discovered what I believe to be a new process of soldering aluminum to aluminum, which I describe as follows: When my flux is applied to aluminum and the metal is heated, the flux first melts, and as the heat is continued and raised to about 350 degrees to 400 degrees centigrade, the flux dissociates, the zinc of the flux forming an alloy with the aluminum for some depth below the surface, such alloy flowing freely at a temperature of about 400 degrees centigrade, which I hereinafter refer to as the alloying temperature.

If two or more parts of aluminum are placed together and my flux applied at the joint, then heated until the before mentioned "alloying temperature" is reached, and afterwards allowed to cool, the parts will be securely soldered together by this molten zinc-aluminum alloy without the necessity of added solder, the corners of the joint having an alloy fillet giving great strength to the joint.

Aluminum may be soldered to other metals by use of this same flux, the aluminum being alloyed with the zinc of the flux and adhering to the dissimilar metal in a similar way to soldering, the zinc-aluminum alloy becoming the solder.

With this flux, any suitable solder may be used on either aluminum, copper, brass, iron, zinc, lead, silver, gold, and some other metals. As an example, either lead, tin, zinc, or their alloys may be used to solder all the metals mentioned, including aluminum.

From the foregoing it will be observed that my flux requires a high temperature for its proper operation, and I estimate this temperature to be between 350 degrees and 400 degrees centigrade, by judging the "alloying temperature" against the melting point of zinc, which is 419 degrees centigrade.

It is acknowledged in the art, that the most efficient joints in aluminum are made at a high soldering temperature, and by using metals or solders having the nearest electro-chemical potential to aluminum.

Zinc is the nearest metal to aluminum in the electro-chemical series, being only slightly electro-negative to aluminum, and zinc being alloyed with aluminum well below the surface of the metal using a high temperature, and the aluminum parts being joined by this alloy, soldering by this process is only slightly inferior in strength and endurance to welding.

Should it be desired to "build up" a joint on aluminum, any suitable solder may be added while the metal is at the "alloying temperature".

My flux as before mentioned, comprises a metal fluoride, ammonium chloride, and zinc chloride, and I mention metal fluorides broadly, because I have tested the fluorides of calcium, magnesium, lithium, aluminum, potassium, and sodium, and found that they all function, but that the fluorides of potassium and sodium are the most satisfactory.

I found that when soldering aluminum, the best results are obtained when a comparatively small proportion of a fluoride is used, too much fluoride has no effect, other than to obscure the operation, and I find that 1% to 3% of sodium fluoride does all that is necessary. The best proportion of ammonium chloride is between 12% and 25%, and zinc chloride between 74% and 87%. A flux comprising, sodium fluoride 1%, ammonium chloride 20%, and zinc chloride 79%, gives excellent results, the flux is in a powder form.

I also have found a liquid flux comprising, sodium fluoride 0.67%, ammonium chloride 14.2%, zinc chloride 49.7%, and water 35.43%. With this liquid flux, lead, zinc, iron, copper, brass, steel, most steel alloys, and many other metals may be easily soldered without the necessity of much cleaning.

By experimenting I have found yet another range of valuable fluxes, by means of which, iron or steel thickly coated with rust, paint, oil, grease, dirt, and black oxide are tinned and soldered without previous cleaning, also copper, copper alloys, galvanized iron, having a thick coating of oxides, paint, grease, etc., may be tinned and soldered without the necessity of cleaning, the flux lifting such oxides, dirt, etc., and tinning the metal by the addition of solder. This flux comprises, sodium fluoride 1% to 3%, ammonium chloride 38% to 68%, and zinc chloride 29% to 59%, and requires a high temperature for its efficient operation. With a flux comprising, sodium fluoride 1%, ammonium chloride 58%, and zinc chloride 41%, rust and oxides of one sixteenth of an inch thickness are easily removed, and the metal tinned, by heating the metal above 400 degrees centigrade, applying the flux, and during the fluxing action, adding the solder, and after tinning, soldering may be done in the usual manner.

To the formulas I have given, there may be added other compounds, powdered metals or solders, or they may be made into pastes as well as liquids.

I have given the essential compounds and formulas for that which I call a high temperature working flux, which will give the strongest and most satisfactory type of soldered joint, the fluxes are easily and cheaply manufactured, and require no more than ordinary skill for their operation.

I am not aware of the exact chemical action which takes place when the flux acts on the aluminum, nor do I know what each element or compound does towards the result, but the combination is very efficient when sufficiently heated, and the resultant joint is strong and clean.

Having thus described my invention, what I claim is:

1. A composition for soldering metals comprising, 1 to 3% sodium fluoride, 12 to 25% ammonium chloride, 74 to 87% zinc chloride.

2. A composition for soldering metals comprising, 1% sodium fluoride, 20% ammonium chloride, and 79% zinc chloride.

JOHN FREDERICK HOWARTH.